US008836762B2

(12) United States Patent  (10) Patent No.: US 8,836,762 B2
Berginc et al.  (45) Date of Patent: Sep. 16, 2014

(54) OPTRONIC SYSTEM AND METHOD DEDICATED TO IDENTIFICATION FOR FORMULATING THREE-DIMENSIONAL IMAGES

(75) Inventors: Gérard Berginc, Thiais (FR); Michel Jouffroy, Guyancourt (FR)

(73) Assignee: Thales, Neuilly sur Seine (FR)

( * ) Notice: Subject to any disclaimer, the term of this patent is extended or adjusted under 35 U.S.C. 154(b) by 135 days.

(21) Appl. No.: 12/952,329

(22) Filed: Nov. 23, 2010

(65) Prior Publication Data

US 2011/0254924 A1   Oct. 20, 2011

(30) Foreign Application Priority Data

Nov. 27, 2009   (FR) ...................................... 09 05720

(51) Int. Cl.
*G06K 9/00*   (2006.01)
*G06T 11/00*   (2006.01)
*G01B 11/24*   (2006.01)

(52) U.S. Cl.
CPC ............ *G01B 11/24* (2013.01); *G06K 9/00201* (2013.01); *G06T 11/006* (2013.01)
USPC ............. 348/46; 348/234; 235/404; 356/456; 342/25 A (58) Field of Classification Search
USPC .................................. 348/46, 234; 342/25 A
IPC ...................................................... H04N 13/02
See application file for complete search history.

(56) References Cited

U.S. PATENT DOCUMENTS

| 5,559,334 A | 9/1996 | Gupta et al. |
| 2007/0076211 A1* | 4/2007 | Toida et al. ................... 356/456 |
| 2008/0181487 A1 | 7/2008 | Hsu et al. |
| 2009/0021423 A1* | 1/2009 | Cheng et al. ................. 342/25 A |
| 2009/0086060 A1* | 4/2009 | Lee ............................... 348/234 |
| 2009/0185741 A1* | 7/2009 | Nahari et al. ................. 382/154 |
| 2009/0251567 A1* | 10/2009 | Guichard et al. ............. 348/234 |
| 2010/0116886 A1* | 5/2010 | Flowers ........................ 235/404 |
| 2011/0019906 A1 | 1/2011 | Berginc et al. |

OTHER PUBLICATIONS

Kapoor, et al., "Features for Detecting Obscured Objects in Ultra-Wideband (UWB) SAR Imagery Using a Phenomenological Approach," Pattern Recognition, vol. 29, No. 11, pp. 1761-1774 (Nov. 1, 1996).

(Continued)

*Primary Examiner* — Jay Patel
*Assistant Examiner* — Neil Mikeska
(74) *Attorney, Agent, or Firm* — Baker & Hostetler LLP (57) ABSTRACT

The invention relates to an optronic system for identifying an object including a photosensitive sensor, communication means and a computerized processing means making it possible to reconstruct the object in three dimensions on the basis of the images captured by the sensor and to identify the object on the basis of the reconstruction. The photosensitive sensor is able to record images of the object representing the intensity levels of an electromagnetic radiation reflected by the surface of the object captured from several observation angles around the object and the communication means are able to transmit the said images to the computerized processing means to reconstruct the object in three dimensions by means of a tomography function configured to process the images of the object representing the intensity levels of an electromagnetic radiation reflected by the surface of the object. The invention also relates to a method of computerized processing for object identification by reconstruction of the object in three dimensions. The invention is applied to the field of target detection, to the medical field and also microelectronics, for example.

13 Claims, 9 Drawing Sheets

(56) References Cited

OTHER PUBLICATIONS

R. A. Robb "Visualization in Biomedical Computing," Parallel Computing, vol. 25, No. 13-14, pp. 2067-2110 (Dec. 1, 1999).

Marino, Richard M. et al, "Jigsaw: A Foliage-Penetrating 3D Imaging Laser Radar System", Lincoln Laboratory Journal, vol. 15, No. 1, 2005, pp. 23-36.

* cited by examiner

OPTRONIC SYSTEM AND METHOD DEDICATED TO IDENTIFICATION FOR FORMULATING THREE-DIMENSIONAL IMAGES

CROSS-REFERENCE TO RELATED APPLICATION

This application claims priority to foreign French patent application No. FR 09 05720, filed on Nov. 27, 2009, the disclosure of which is incorporated by reference in its entirety.

FIELD OF THE INVENTION

The invention relates to optronic systems for identifying an object in the technical field of non-conventional optical imaging and more particularly three-dimensional photonic imaging. This imaging is commonly called "full-3D" which should be distinguished from a 2.5D image which contains only the 2D intensity information plus the depth information.

BACKGROUND OF THE INVENTION

Automatic identification of objects by an optronic system is used in multiple fields. The field of defence and security for the recognition of targets, the medical field for the detection of subcutaneous and cutaneous tumours or the field of microelectronics for the observation of hardware components during their manufacture may be cited by way of example. An optronic system creates a 3D image of an object present in a complex optronic scene. This image must for example make it possible to pick out camouflaged targets behind camouflage netting, under trees, etc. This operational condition constitutes the major problem.

In this field of 3D imaging, it is necessary to obtain a set of measurements of the object to be reconstructed dependent on a variable parameter (angle and/or dimension in terms of depth for example); this data set makes it possible to reconstruct the volume by applying inverse reconstruction techniques. From a mathematical point of view, the technique breaks down into two steps: direct measurement, optionally processed using a model of the physical phenomena measured, and then reconstruction by inversion on the basis of these direct measurements. The first problem consists in providing in a reasonable time a set of direct data that can be utilized for the inversion process. This problem naturally covers all the technological problems (high rate illumination laser, short pulse, fast detector block, pointing). The second problem relates to the inversion procedure used and its mathematical implementation.

A first optronic system for identifying objects is known. It involves a profilometric 3D active imaging system whose characteristics are disclosed in a publication whose references are as follows: "Lincoln laboratory Journal Vol. 15 number 1 2005, Jigsaw: a foliage Penetrating 3D imaging laser radar system". U.S. patent publication US/2008/0181487 presenting the spatial registration procedure for aerial craft is known. It involves an air/ground acquisition system which performs a certain number of measurements on an optronic scene from different observation angles. For each observation angle, the system recovers distance and intensity information on a grid of large dimension (>256×256). The system uses the principle of profilometry to pick out the various points from echoes situated on one and the same sighting line. The principle of this 3D imaging relies on the use of a short-pulse (of the order of a nanosecond) laser source with a high sampling rate. A single laser pulse illuminates the complete scene; a 2D matrix detector counts the photons backscattered by the scene and their delay with respect to emission. The image is produced by scanning. This technique then requires optimization of the scan to produce an image in a time compatible with the displacement of the UAV ("Unmanned Aerial Vehicles") for example. The image produced by this device is a map of photons detected in 3D by virtue of the multiple echoes on a sighting line. The accumulation of several maps of this type for different observation angles after spatial registration makes it possible to create clouds of points portraying the surface of the object to be identified. The problem of the inverse function of constructing the 3D image is limited to concatenating a set of data in the same reference frame and to extracting the zone of interest containing the data to be identified. This system exhibits several technological difficulties. First of all, it is necessary to use a short-pulse laser and a detection system provided with fast electronics to determine the distance between the laser source and the detector for each of the pixels. Moreover, the step of registering the clouds of points requires the use of an efficacious pointing and geo-location system so as to allow the concatenation of images in one and the same reference frame. To summarize, such a solution exhibits a significant cost related to the technology to be implemented for image acquisition and therefore does not make it possible to democratize a "full-3D" detection application such as this in all fields. Furthermore, this solution remains difficult to implement for guided airborne systems.

A second optronic system of transmission 3D tomographic imaging used in medical imaging is known. The general principle is as follows: a fine pencil of X rays, issuing from a collimated source, scans the body of the patient and carries out a first profile of the object. The system then undergoes an elementary rotation and the process is repeated, thus providing new profiles, stemming from a different projection angle. On the basis of these data and by virtue of the algorithms based on Radon's theory, the values of the attenuation coefficients at each point of the section must be computed, thus providing a mapping of the internal tissues. The scanner therefore relies on the greater or lesser absorption of X rays, depending on the medium traversed. The direct problem in this case relies on knowing the electromagnetic absorption parameters for the tissues traversed.

A third known solution is a system for modelling 3D objects on the basis of multiple views. Two main principal methods of synthetic construction of objects according to this principle are known.

The first method consists in extracting silhouettes. The idea is to place the object to be represented in three dimensions on a turntable and to capture snapshots by conventional visible imaging from various angles. After extracting the silhouette of the object on each image, each silhouette is applied over a 3D volume according to the observation angle, preserving only the part of the volume which is situated inside the silhouette. This method exhibits a problem related to the lighting of the object which must comprise the fewest possible shadows and the object must stand out perfectly from the background whatever the angle. By this means a not very detailed exterior envelope of the object is obtained and if the object contains zones of shadow or noise a large part of the information is lost. Moreover, this method does not allow identification of a partially masked object.

The second method is the procedure for minimizing surface areas. This technique consists in reconstructing a surface on the basis of noteworthy points on the 2D images of objects by algorithms for minimizing the surface area or for linking up small patches. The technique consisting in applying patches over a grid of telemetred points is generally performed from a single observation angle; it may be extended to several angles within the framework of a complete reconstruction entailing significant time and means of computation but may not be applied to partially masked objects on account of the necessary continuity between the patches. These procedures are akin to stereoscopy techniques making it possible to reproduce the perception of relief on the basis of two plane images (2.5D image, depth perception).

Ultimately, the problems with the prior art solutions are on the one hand the cost and the inaccessibility of the technological means and on the other hand the impossibility of being used in unknown and uncontrolled environments or of allowing the detection of camouflaged objects.

SUMMARY OF THE INVENTION

The invention provides a 3D detection and reconstruction solution with technological means which are accessible in terms of cost and performance. Furthermore, the technical solution is able to be used for applications for which the scene to be observed is not controlled by the operator and also partially masked.

More precisely, the invention is an optronic system for identifying an object comprising a photosensitive sensor, communication means and a computerized processing means making it possible to reconstruct the object in three dimensions on the basis of the images captured by the sensor and to identify the object on the basis of the reconstruction, characterized in that the photosensitive sensor is able to record images of the object representing the intensity levels of an electromagnetic radiation reflected by the surface of the object captured from several observation angles around the object and the communication means are able to transmit the said images to the computerized processing means so as to reconstruct the object in three dimensions by means of a tomography function configured so as to process the said images of the object representing the intensity levels of an electromagnetic radiation reflected by the surface of the object.

According to an embodiment, the system comprises a means for emitting an electromagnetic pulse that can emit towards the object and the photosensitive sensor is able to detect the intensity level of the electromagnetic pulse reflected by the object.

Advantageously, the system also comprises a means for pointing towards a reference position allowing the photosensitive sensor to record a sequence of images captured from observation angles that are close and centred on the reference position and the computerized processing means is able to position on the reference position each image of the sequence shifted from the reference position.

Advantageously, the system also comprises means for measuring the distance between the photosensitive sensor and the reference position so that the computerized processing means is able to modify the dimensions of the object represented in an image as a function of the said distance so that the dimensions of the object represented in the images of one and the same sequence that are used for reconstruction are equivalent between the images.

Advantageously, the computerized processing means is able to modify the illumination of an image as a function of the distance between the photosensitive sensor and the reference position so that the images of one and the same sequence that are used for reconstruction are of an equivalent illumination level.

According to an embodiment, the photosensitive sensor is mounted on a mobile craft able to move around the object.

According to an embodiment using active imaging, the means for emitting an electromagnetic pulse and the photosensitive sensor are mounted on a mobile craft able to move around the object.

According to an embodiment the mobile craft is an aircraft and the computerized processing means is located in a computing station remote from the photosensitive sensor connected to the sensor by the communication means.

According to an embodiment, the system comprises a reference object database for identifying the object by comparison with the three-dimensional reconstruction.

The invention also relates to a method of computerized processing for object identification by reconstruction of the object in three dimensions.

Advantageously, it comprises the following successive steps:

Acquisition of a sequence of images of the object representing the intensity levels of an electromagnetic radiation reflected by the surface of the object, Reconstruction of the object in three dimensions by a tomography function utilizing the two-dimensional images representing the intensity levels of an electromagnetic radiation reflected by the surface of the object, Extraction of the zone of the three-dimensional reconstruction comprising the object to be identified, Reconstruction of the surface of the object in three dimensions, and Comparison of the object in three dimensions with a reference object.

Advantageously, the method comprises, subsequent to the step of acquiring images, a step of positioning an image on a reference position.

Advantageously, the method comprises, subsequent to the step of acquiring images, a step of redimensioning an image with respect to a reference image so that the dimensions of the object detected in an image are similar to the dimensions of the object in a reference image.

Advantageously, the method comprises, subsequent to the step of acquiring images, a step of modifying the illumination of an image as a function of a reference image so that the illumination of the image is similar to the illumination of a reference image.

Advantageously, the method comprises, subsequent to the step of acquiring images, a step of processing the sinogram of an image so as to extract the object-related information from the other information of the image. The sinogram is a representation of the evolution of one and the same row (or of one and the same column) of the image and of its variation as a function of the angle in relation to the second dimension (ordinate).

A first advantage of the optronic system and of the associated image reconstruction method is the ability to detect partially masked objects with technological means not requiring high acquisition and processing performance. Indeed, contrary to the profilometric active imaging solution of the prior art, the laser radiation photosensitive sensor is a conventional detection means. Thus, the invention yields a lower-cost solution since the problem of 3D reconstruction on the basis of two-dimensional images is solved by the image processing method. The electromagnetic pulse emission means, the photosensitive sensor and the geo-location means involve lesser development constraints and make it possible to provide a lower-cost solution to onboard applications in constrained environments of use.

A second advantage of the invention is that the tomography method used does not require the need for fine spatial control of the mobile craft onboard which the photosensitive sensor is carried (only 3 degrees of freedom as against 6 with the conventional profilometric device or fixed trajectory in medical imaging), that is to say in position, motion or orientation and also does not require a knowledge of the absorption coefficients of the objects present in the scene, contrary to customary transmission tomography solutions. Thus, the system and the image processing method may be used for more numerous fields of application and notably for camouflaged target applications.

A third advantage inherent in the 3D reconstruction method is the provision of an object detection solution that is much more efficacious than for a detection solution based on 2D or 2.5D images. Indeed, a 3D image provides the operator and the analysis systems with much more information relating to the object, thus improving the diagnostic capabilities.

BRIEF DESCRIPTION OF THE DRAWINGS

The invention will be better understood and other advantages will become apparent on reading the nonlimiting description which follows and by virtue of the appended figures among which.

DETAILED DESCRIPTION

Figure 1:
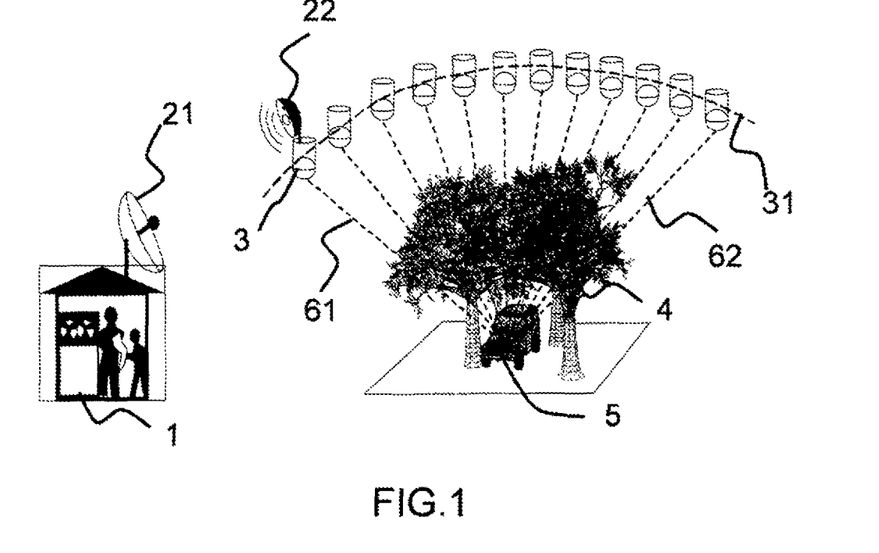
FIG. 1 represents a basic diagram of an embodiment of the invention for a system comprising an airborne acquisition platform and an image processing ground station.

The invention uses conventional active imaging, that is to say the realization of intensity 2D images with the aid of a monostatic ladar system. However, the system and the method such as claimed also apply to passive imaging. According to an embodiment such as represented by FIG. 1 an airborne platform 3 makes it possible to acquire a sequence of images of a wide scene on the ground comprising a targeted object 5, in this case a motor vehicle, partially camouflaged by other objects 4, trees or camouflage netting for example, in the course of a predefined trajectory 31 from known observation angles 61 and 62. Communications means 21 and 22 make it possible to transmit the images acquired to image processing means situated in a remote ground station 1.

Figure 2:
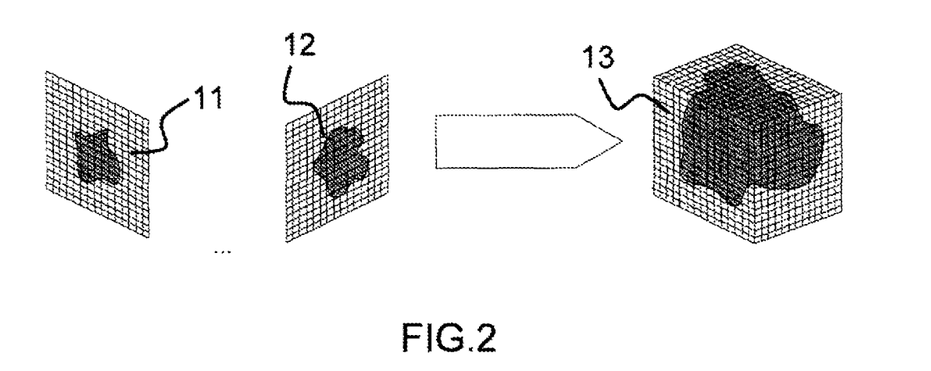
FIG. 2 represents the principle of three-dimensional reconstruction by tomography.

As represented in FIG. 2, after an optional registration and processing of these images 11 and 12, the filtered-back-projection algorithm makes it possible to reconstruct by tomography a 3D volume 13 of the scene. Given that the targeted object is opaque to the electromagnetic pulses of the laser, that is to say the pulse is reflected by the surface of the object, there is no correction of the direct measurement since the integral along an observation line is limited to the value of the intensity backscattered at a point. The sweeping of this volume by sectional planes makes it possible to tag a region of interest. The processing of this region makes it possible to extract a certain number of voxels ("volumic pixels") which after grouping are enveloped by a surface making it possible to reveal a three-dimensional shape comparable with a known 3D structure of CAD (Computer Aided Design) type for identification purposes (by "matching", shape recognition, comparison with spin-images, etc.).

Figure 3:
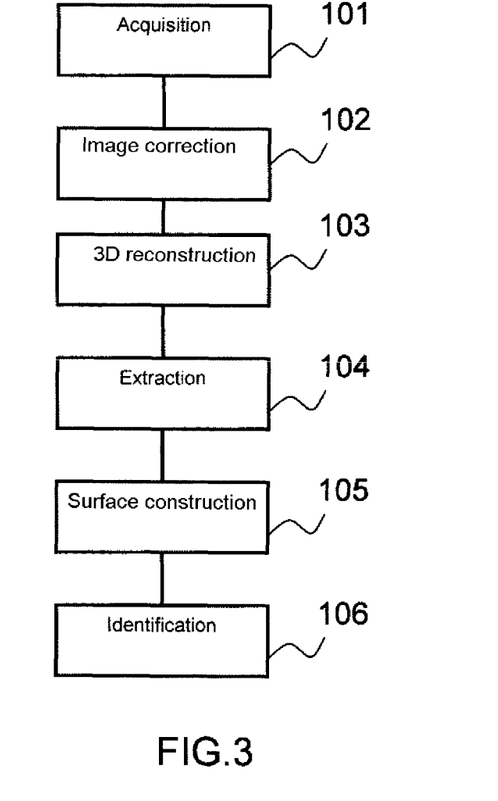
FIG. 3 represents the steps of the image processing method according to the invention.

The invention also relates to the method of computerized processing of the images such as is represented by FIG. 3 which comprises a certain number of steps, the specifications of which should be complied with to obtain the expected result. The method will be the subject of the description subsequent to the detailed description of the structural means for implementing the invention.

The airborne platform 3 comprises a means for emitting an electromagnetic pulse. This is a ladar device used in monostatic or quasi-monostatic configuration (angle of emission equal to the angle of reception), the benefit of this configuration being that the illuminated scene has a minimum of shadow zones. Moreover, the optic used is dimensioned for the sensor and the wavelength chosen, here again with the aim of improving their sharpness and their contrast. The spatial and temporal widths of the laser pulse must be sufficient to illuminate the whole scene, typically several tens of meters.

By way of nonlimiting example, the characteristics of the laser are as follows for illuminating a scene contained in a volume of 30 meters by 30 meters by 30 meters:

laser with pulse greater than 200 ns, divergence of the laser: 15 mrad at 1 km to 3 mrad at 5 km, the repetition frequency must be some hundred Hertz at the minimum, typically, so as to enable post-integration. At this rate, for a carrier travelling at 50 m/s for example, the displacement between two consecutive images is 50 cm. At 5 km, the corresponding angular swing is 100 μrad, thereby permitting post-integration since the necessary angular swing between two images will be of the order of a degree (that is to say 17.5 mrad i.e. typically 175 times as large), wavelength 1.5 μm (stealth, ocular security), and low energy per pulse (of the order of some ten mJ, typically).

The photosensitive sensor, also onboard the airborne platform 3, consists of a detector sensitive in the near infrared (for example an InGaAs 2D matrix of large dimensions). The acquisition process is then that of an intensity-based bi-dimensional laser active image.

The acquired images are transmitted forthwith to a ground processing station by radiofrequency or optical communication means 21 and 22 known to the person skilled in the art whose characteristics do not form the subject of a limitation of the invention. The technical characteristics of the communication means determine the possible distance between the processing station and the mobile craft onboard which the image acquisition means are carried. In air/ground configuration, the constraints related to the turbulence, to the speed of displacement of the carrier, to the dynamics of the sensor and to the precision of pointing allow a distance of the order of 5 km typically between the carrier and the target.

Image processing means 1 make it possible to carry out a post processing of image corrections whose functions will be described in greater detail hereinafter. These processing means make it possible to correct the images before executing the 3D reconstruction process so as to improve the precision of reconstruction of the object. These same image processing means thereafter make it possible to carry out the identification operations in an automated manner or to transmit the 3D reconstruction to display means for manual identification by an operator.

Positioning the emission/detection block on an airborne platform 3 makes it possible to observe the scene over a large angular swing and according to several trajectories. In this embodiment where an aircraft is used, several passes of the aircraft (for example a drone or a helicopter) are then carried out according to different azimuthal observation planes. Multiplication of the observation angles affords additional information and refines the resolution of the final reconstruction.

Geo-location means must make it possible to register each 2D image with respect to a reference point in space (theoretically 3 degrees of freedom, the rotational degree of freedom being the most limited). The precision of the reference point is of the order of 1 m for a few kilometres of altitude, this precision is sufficient for reconstruction. These geo-location means may be a telemetry device or a satellite-based positioning device. The telemetric or satellite-based positioning data are indispensable since they allow the location of a fixed point in the image and the registration of the whole sequence with respect to this fixed point. The use of the inertial unit of the airborne platform 3 (or aircraft) and of telemetry are conceivable and also assist in increasing the precision of positioning of the centre of rotation.

A means for pointing the laser beam and the photosensitive sensor is used so as to centre the snapshot on the reference point.

Operationally, the images may be transmitted gradually to a ground processing station by conventional radio communication means or processed directly at the level of the airborne platform.

The claimed subject matter also relates to the method of image processing for the identification of an object. FIG. 3 represents the steps of the image processing method according to the invention. The image processing method comprises a first step 101 of acquiring the images, a second step 102 of correcting the images, a third step 103 of 3D reconstruction of the acquired scene, a fourth step 104 of extracting a zone of interest in the 3D reconstruction comprising the object, a fifth step 105 of forming the surface of the reconstructed object and a sixth step 106 of identifying the reconstructed object. All these steps are conducted in succession, though other preliminary, intermediate or additional steps may be added to the conduct of the method without however departing from the scope of the invention.

Figure 4:
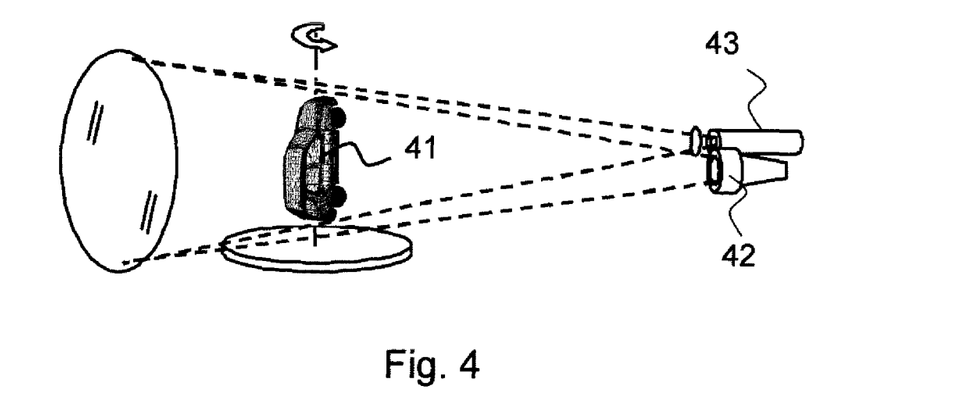
FIG. 4 represents a diagram for acquiring the sequence of images within the framework of reduced-scale laboratory experimentation.

More precisely, the first acquisition step 101 provides a sequence of images from several observation angles and also several images for one and the same observation angle so as to obtain the highest possible signal/noise ratio. Moreover, to be utilizable by the proposed technique and to provide an optimal representation, the images must exhibit dynamics and contrast in particular between the target that one wishes to see represented in a three-dimensional manner and the remainder of the scene. FIG. 4 illustrates reduced-scale laboratory experimentation making it possible to represent in a simplified manner an acquisition step in the course of which the object 51 to be identified is illuminated by a source for emitting an electromagnetic pulse 43 and detected by the photosensitive sensor 42 at several angles. According to an optimal acquisition step, the object is seen from all the possible observation angles contained in a plane so as to reconstruct the object in the most complete manner possible. Nonetheless, the acquisition step can comprise a reduced number of viewing angles making it possible to model a partial reconstruction in three dimensions. Thus, the identification on the basis of a 3D model is improved with respect to an identification on the basis of a 2D view.

The second image correction step 102 comprises several mutually independent correction functions. A first correction function is a positioning of an image with respect to a reference position in the image. When the photosensitive sensor is mounted on a mobile craft, such as for example an aircraft, whose trajectory is not perfectly controlled, the image positioning or image registration function makes it possible to improve the signal/noise factor of an image sequence whose observation angles are very close. This function for registering an image with respect to a reference position is performed by determining the correlation coefficient between two successive images of the sequence.

Figure 5:
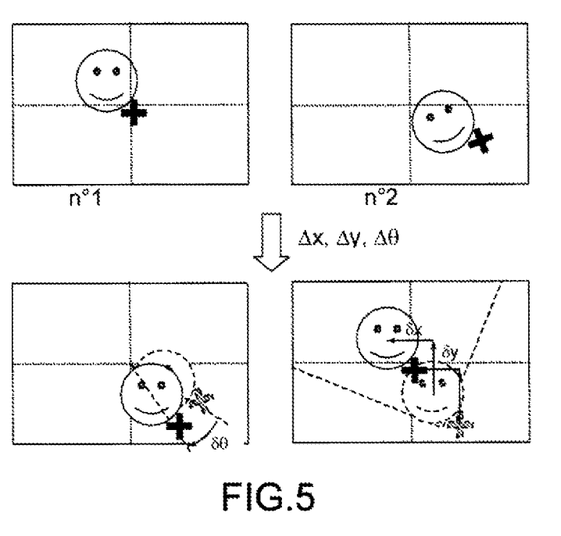
FIG. 5 represents a diagram illustrating the principle of a first image correction function for registration, shifted by a reference position.

In FIG. 5 which presents two neighbouring images but mutually shifted by ($\Delta x, \Delta y, \Delta \theta$), the correlation matrix-based registration process makes it possible to obtain a jump-free image sequence, but also to correct the positioning of the fixed point of rotation from one image to another without any telemetric or satellite-based positioning knowledge. The correlation coefficient $\rho(X,Y)$ is given by the customary expression:

$$\rho(X, Y) = \frac{\text{Cov}(X, Y)}{\sqrt{\text{Var}(X) \cdot \text{Var}(Y)}}$$

where Cov(X,Y) is the covariance function defined by:

$$\text{Cov}(X, Y) = E[(X - \langle X \rangle) \cdot (Y - \langle Y \rangle)]$$

$$= \frac{1}{n} \sum_{i=1}^{n} (X_i - \langle X \rangle)(Y_i - \langle Y \rangle)$$

and Var(X) is the variance defined by:

$$\text{Var}(X) = \frac{1}{n} \sum_{i=1}^{n} (X_i - \langle X \rangle)$$

A rotation $\delta\theta$ of image No. 2 is performed and the coefficient of correlation between the two images over a portion of the image of large size (containing notably the zone of the image where the target to be registered is situated) is computed. The second image is shifted along the directions $\delta x$ and δy inside a window of predefined size which represents the maximum shift that may be expected from one image to another. The operation is repeated while incrementing the angle of rotation up to the maximum value permitted. The maximum of the correlation matrix found gives the values of shift (Δx, Δy) between the two images for a given Δθ. The operation is repeated for each image of the sequence. To increase the dynamics of an image it is possible thereafter to average over several registered images if they correspond to sufficiently close observation angles.

Figure 6:
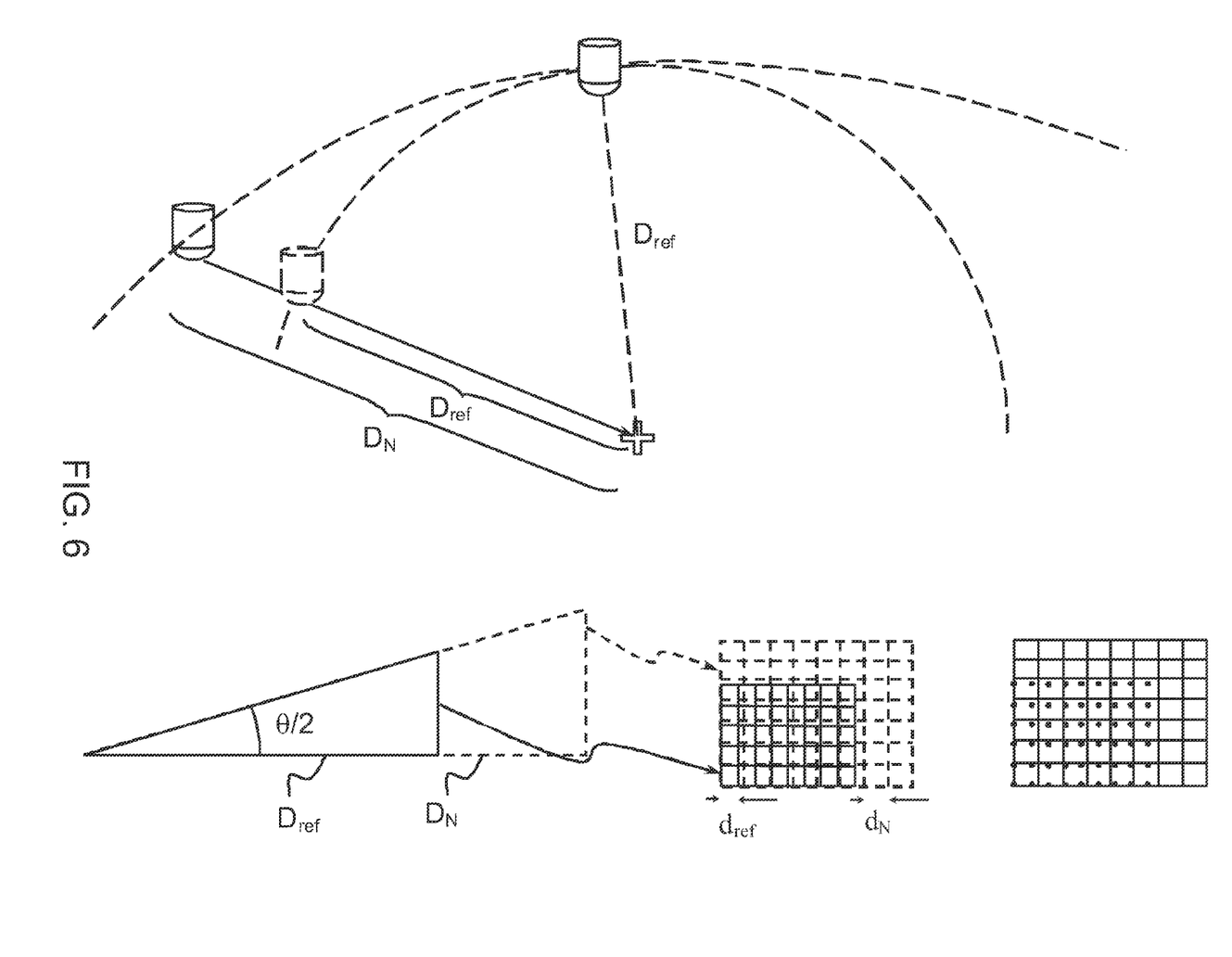
FIG. 6 represents a diagram illustrating the principle of a second image correction function for the redimensioning of an image with respect to a reference image.

Moreover, to be directly utilizable, it is necessary to implement a second correction function related to the variation in the distance between the photosensitive sensor and the reference position throughout the image capture sequence. Indeed, it is necessary for the images to be captured at constant distance from this reference position. Operationally, for the preferential embodiment where the photosensitive sensor is mounted on an aircraft, the trajectory is liable to be rectilinear, or indeed curved but rarely circular. Accordingly, the geometric correction function makes it possible to solve the problem of variation in distance between the sensor and the reference position aimed at. This function makes it possible to modify the size of each image as a function of its distance from the circular trajectory (application of a ratio Γ) if it is assumed that one is working at constant field so that the surface area dimension common to all the images of the sequence is identical and therefore their dimensions in terms of pixels too. The formulation of the geometric correction function comprises a first step of determining the reference image of the sequence for which the photosensitive sensor is closest to the target. This image will serve as spatial reference for the reconstruction. For this reference image the target/carrier distance is referenced in FIG. 6 by $D_{ref}$. There is then a second step of determining for each image on the basis of the geo location data the target/carrier distance referenced $D_N$. Each image N of the sequence must be oversampled, according to the spacing of the reference image $d_{ref}$ on the grid of spacing $d_N$. These two spacings are linked by the relation:

$$\frac{D_N}{D_{ref}} = \Gamma = \frac{d_N}{d_{ref}}.$$

Figure 7:
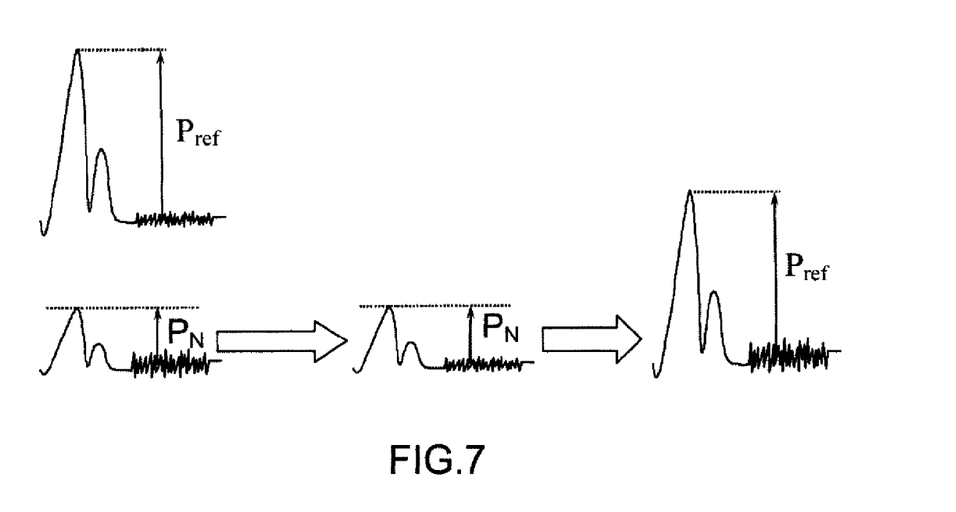
FIG. 7 represents a diagram illustrating the principle of a third image correction function whereby the illumination of the images of one and the same sequence is made homogeneous.

A third correction function for the illumination of the scene improves the 3D reconstruction since the luminous power received on the detector varies as $$1/D^4$$

(ladar equation), D being the ladar/target distance. FIG. 7 represents the correction principle. The signal of power $P_{ref}$ represents the luminous power received at the distance $D_{ref}$ corresponding to the closest target/carrier distance $D_{ref}$. $P_N$ represents the luminous power received at the target/carrier distance $D_N$ for an image N of the trajectory. The illumination correction function comprises a first step of reducing the noise and then a step of spreading the dynamics of the image so as to attain the level of the reference image.

Figure 8:
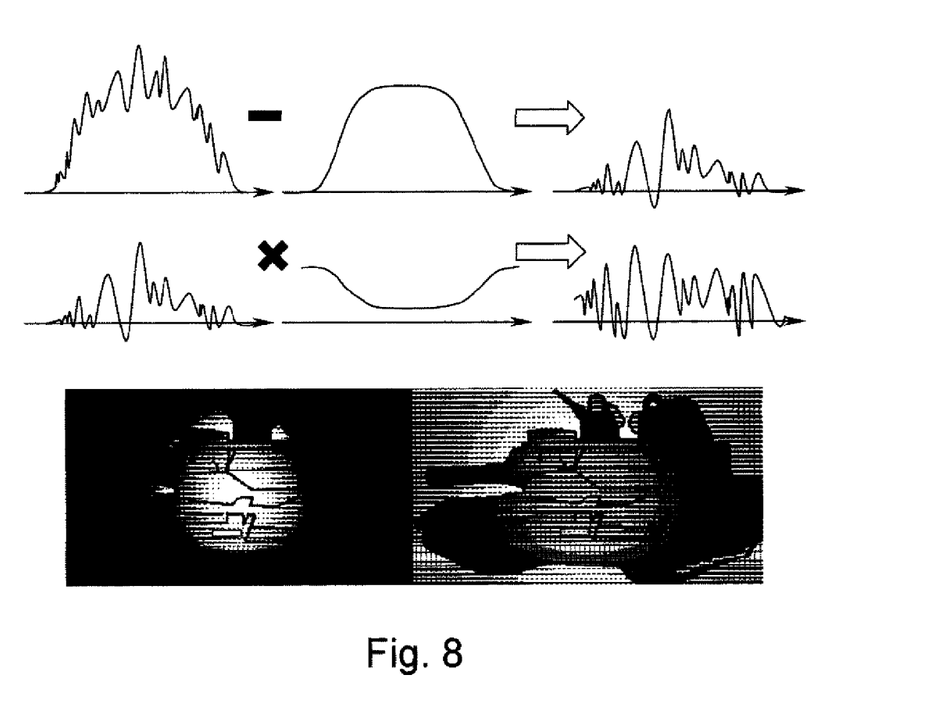
FIG. 8 represents a diagram illustrating the principle of a fourth image correction function for alleviating the focal spot defect of a laser device.

A fourth correction function that may possibly be applied and the principle of which is illustrated in FIG. 8, concerns the illumination pattern related to the laser beam's spatial shape. The latter may be Gaussian (ideal case of the single-mode laser), "top-hat" or multimode. Without correction, the image is very luminous in the central part and increasingly dim at the image boundary. Knowing the laser's illumination pattern, this fourth correction function makes it possible to approximate a uniform illumination over the surface of the image.

This fourth function comprises several steps. A first step is the application of a low-pass filter to the image from which any spikes of specular intensity have been removed, a second step is the subtraction of the filtered image and of the initial image and a third step is the multiplication of the resulting image by the inverse profile.

Figure 12:
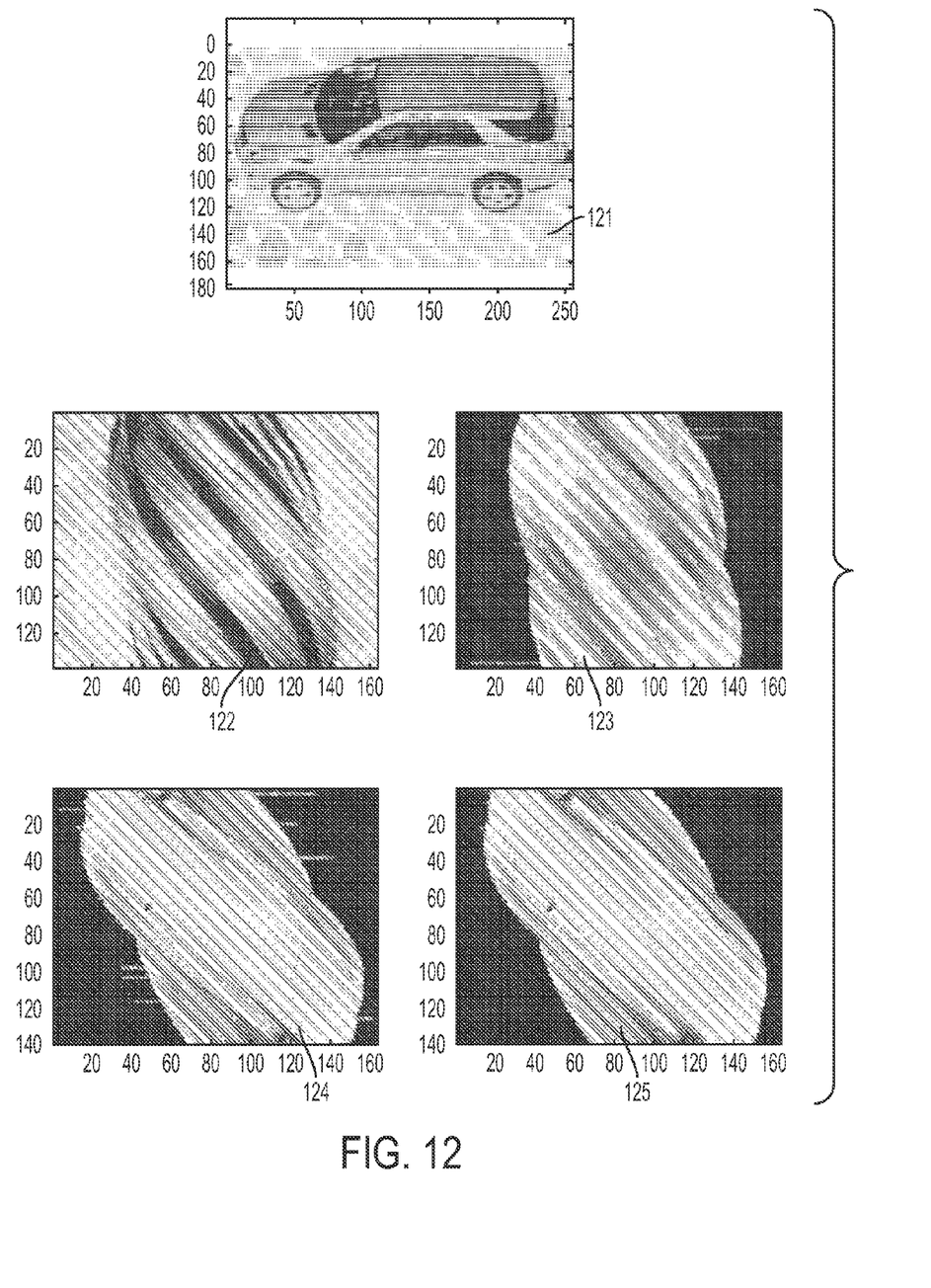
FIG. 12 represents the case of a target that is globally less reflecting than the background of the scene and the result of a fifth image correction function on the associated sinograms. The sinogram is a representation of the evolution of one and the same row (or of one and the same column) of the image and of its variation as a function of the angle in relation to the second dimension (ordinate).

The reconstruction algorithm will be able to operate without additional image preprocessing in all cases where the target stands out from the background by being globally more reflecting than the latter. In the case where the target is globally less reflecting than the remainder of the scene, a fifth correction function aimed at separating the image from the background by processing of the image will be applied to the initial sequence of images. The image 121 illustrates this case: the image of the target exhibits good dynamics but the remainder of the scene is reflecting. The reconstruction algorithm can be applied to the raw image; however, the processing of the reconstructed 3D image turns out to be more difficult given the inversion of contrast: it is the weakly reflecting parts which emerge in a kind of three-dimensional negative. The three-dimensional reconstructed image therefore turns out to be difficult to read. In this case where the target stands out visually from the background, one works directly on the sinogram to separate the target of interest from the background. The technique is to read the sinogram 122 line by line (i.e. angle by angle) starting from the first pixel and then starting from the last pixel in the opposite direction and to utilize the break in intensity between the signal emanating from the background and that from the target; the sinogram 123 is obtained. This processing may be rendered automatic. The processing of the image can be further refined by smoothing the envelope of the sinogram relating to the target: the sinogram 124 exhibits residuals arising from the background of the scene which have disappeared after smoothing on the sinogram 125. This correction is advantageous for the use of the invention in complex environments with weak contrast or inverted contrast. The resolution of this problem is particularly significant for identifying camouflaged objects in the observed scene.

Other image processing functions for facilitating the 3D reconstruction may be used in the course of the image processing method without departing from the scope of the invention.

The third step 103 corresponds to the step of reconstructing the entirety of the scene common to all the images of the sequence and is performed by techniques of Radon transformation (filtered backprojection for example). The latter consists in filtering all the projections and in performing a change of variables making it possible to switch from a system of cylindrical coordinates (x,y,θ) to a Cartesian system (x,y,z). The inverse Radon transformation function is carried out with images representing data of reflection of the electromagnetic pulse on the surface of opaque objects of the scene. Customarily, the inverse Radon transformation technique is performed on the basis of data related to the absorption of the structure of the object in the medical field for example. It is necessary to determine the absorption functions of the medium by simulating the propagation of the electromagnetic wave in the medium considered. This simulation is in all cases mathematically approximate. Its precision depends on the physical model used which is merely a mathematical approximation of physical reality. It is these absorption functions which are inverted. The precision of the inversion depends directly on the simulated absorption data. In the case that we are considering, the inversion is performed directly on the measured values within the framework of the direct problem.

The inverse problem considered here is not contingent on intermediate values simulated with the aid of approximate models.

Figure 9:
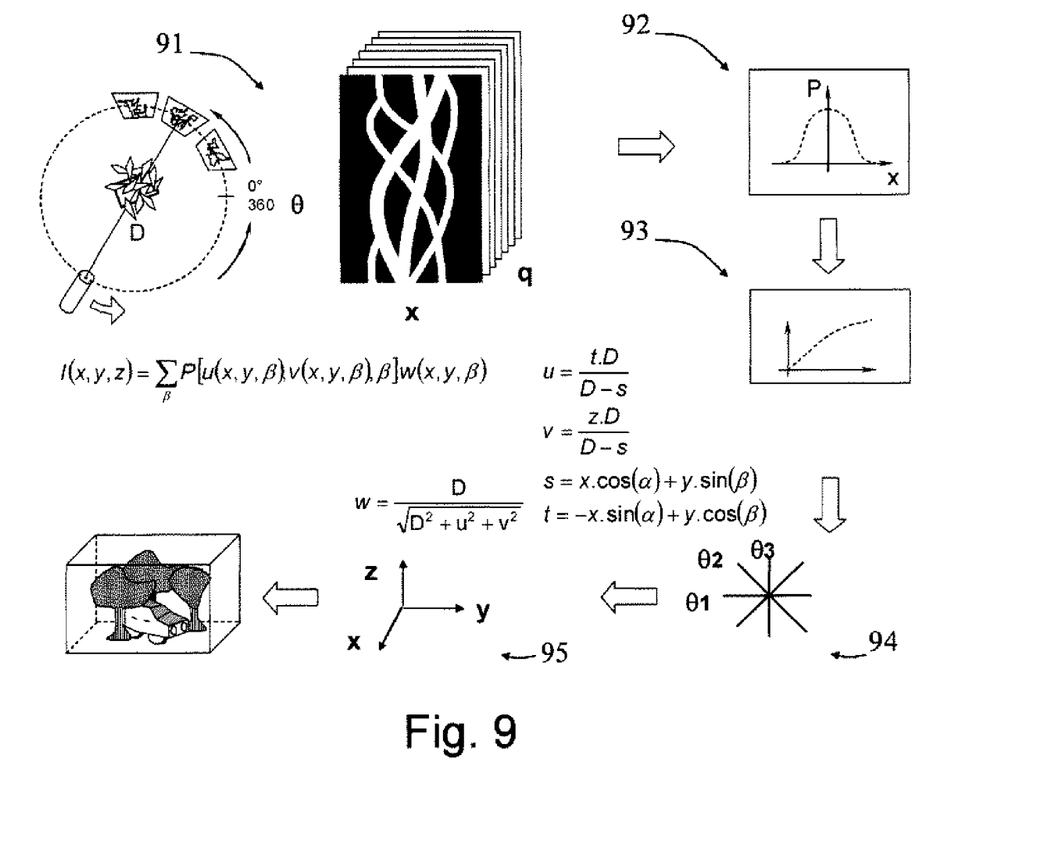
FIG. 9 represents a diagram illustrating the steps of the inverse transformation algorithm.

The algorithm comprises a first step 91 of reading the complete sequence of images, that is to say a sequence of images captured from several observation angles θ around the object. It comprises a second step 92 of weighting the pixels as a function of the gap to the centre of the image. This step is intended to minimize the shift of the points which are at the image boundary so as to reduce the noise factor during reconstruction. The algorithm thereafter comprises a third step 93 of low-pass filtering type so as to smooth the images, and then a fourth step 94 of computing the voxels in each sectional plane by backprojection and then a fifth step 95 of reconstructing the volume by summing the backprojections.

The inverse Radon transformation function is as follows: I is the computation of the voxels in each sectional plane by backprojections arising from the fourth step 94, P are the filtered projected pixels arising from the third step 93 and w is the weighting factor of step 92.

Figure 10:
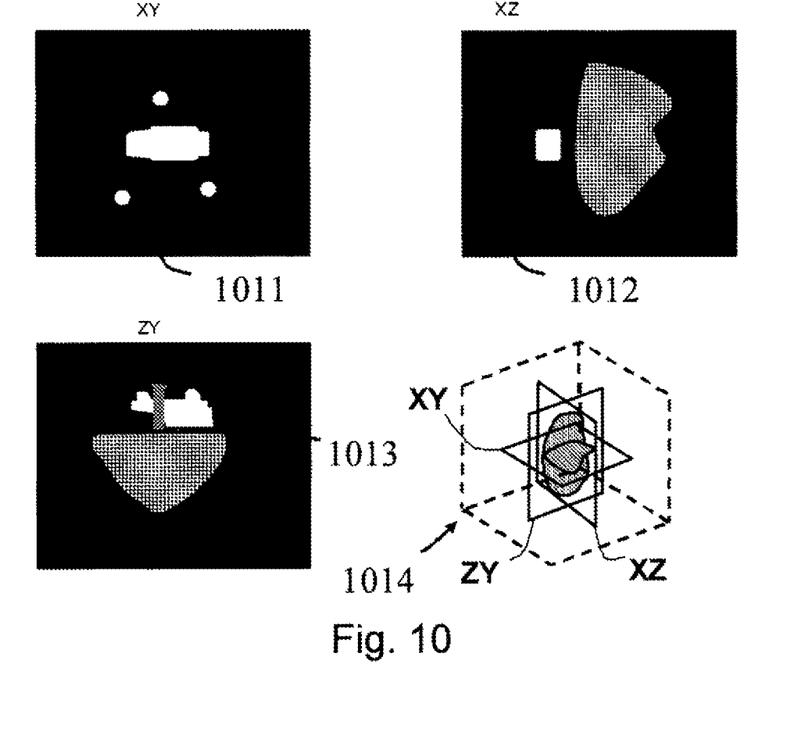
FIG. 10 represents a diagram illustrating the principle of the step of extracting a zone of interest in a 3D zone according to the method.

FIG. 10 illustrates the fourth step 104 of the image processing method which is the extraction of the zone of interest. The reconstructed scene takes the form of a 3D matrix of real numbers 1014 representing intensities. To utilize it, use is made of a representation of 2D sectional planes XY, XZ, ZY in relation to the three principal axes of the cube making it possible to visually isolate a region of interest 1011, 1012, 1013. Once this operation has been performed, a volume of interest is obtained in which the information that one wishes to represent has been selected; all these operations are done manually but may very well be automated by adding a criterion regarding the location in the scene (for example it is known that the object sought will be at a given height with respect to the ground in the scene) or regarding the intensities or regarding the recognition of shapes.

Figure 11:
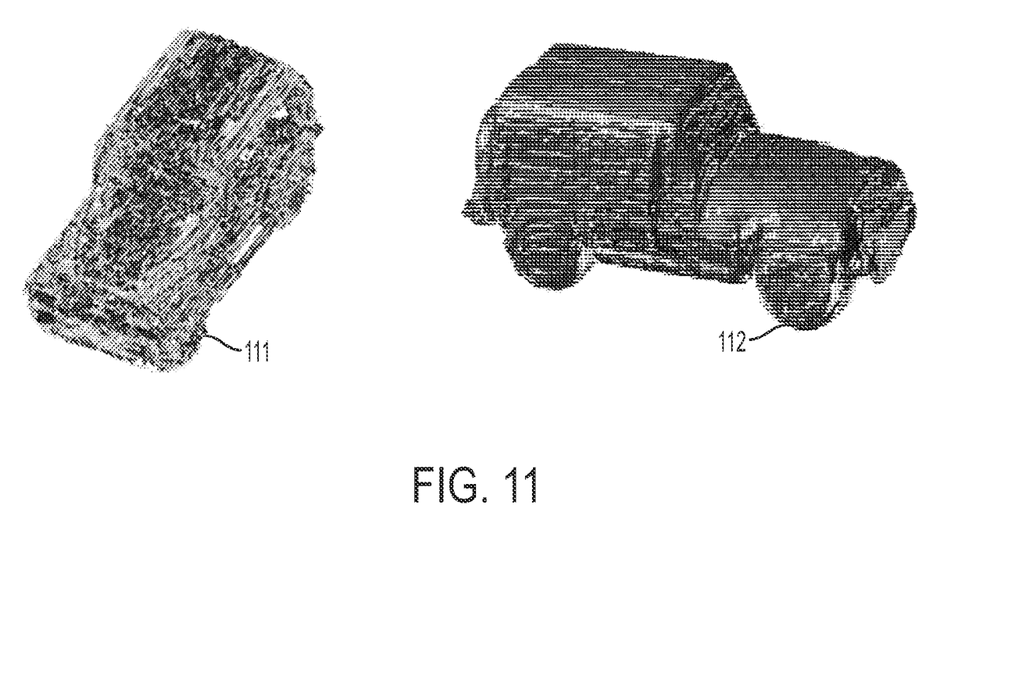
FIG. 11 represents a diagram illustrating the principle of the step of constructing the surface of the 3D object detected.

The fifth step 105 is a step of constructing the surface of the object 111 by grouping the voxels. The object 111 is a formation of several voxels. The function deployed in this step uses a criterion for grouping the voxels in the region of interest as a function of intensity; a shape emerges from this grouping and it merely remains to reconstruct the surface of the object by iso-densities and highlighting for rendition. On completion of this step 105, a surface 112 is obtained.

The sixth step of the method is a step identifying the reconstructed object with a database of objects. The reconstructed surface is compared by an operator with a CAD database by "matching", shape recognition, comparison with "spin-images" for example. This processing may be automated, it may be performed on the ground station or in the UAV's computer.

The optronic system and the method for computing the 3D images apply in general to the identification of objects that may possibly be partially masked in a scene and which are not directly manipulatable by the operator. The invention applies to the field of security and defence for the detection of camouflaged targets, to the medical field for the detection of cutaneous or subcutaneous tumours and also in the field of microelectronics.

What is claimed is:

1. An optronic system for identifying an object, comprising:
   a photosensitive sensor;
   communication means;
   a computerized processing means which reconstructs the object in three dimensions on the basis of images captured by the photosensitive sensor and identifies the object on the basis of the reconstruction, the object being a partially camouflaged object;
   wherein the photosensitive sensor records the images of the object representing intensity levels of an electromagnetic radiation reflected by a surface of the object captured from a plurality of observation angles around the object and the communication means transmits the images to the computerized processing means to reconstruct the object in three dimensions by means of a tomography function configured to process the images of the object representing the intensity levels of the electromagnetic radiation reflected by the surface of the object;
   a means for pointing towards a reference position allowing the photosensitive sensor to record a sequence of images captured from observation angles that are close to and centred on the reference position and the computerized processing means is configured to position on the reference position, each image of the sequence shifted from the reference position and configured to reconstruct, in three-dimensions, the surface of the object by extracting a zone of interest in a three-dimensional reconstruction of a scene captured by the sequence of images, said three-dimensional reconstruction of the scene including an image of the object; and
   means for measuring a distance between the photosensitive sensor and the reference position so that the computerized processing means is configured to modify dimensions of the object represented in an image as a function of said distance so that the dimensions of the object represented in the images of the same sequence that are used for the reconstruction are equivalent between the images, wherein the computerized processing means is configured to modify an illumination of the image as a function of the distance between the photosensitive sensor and the reference position so that the images of the same sequence that are used for reconstruction are of an equivalent illumination level.

2. The optronic system according to claim 1 further comprising:
   a means for emitting an electromagnetic pulse emitted towards the object, the photosensitive sensor is configured to detect an intensity level of the electromagnetic pulse reflected by the object.

3. The optronic system according to claim 1, wherein the photosensitive sensor is mounted on a mobile craft able to move around the object.

4. The optronic system according to claim 2, wherein the means for emitting an electromagnetic pulse and the photosensitive sensor are mounted on a mobile craft able to move around the object.

5. The optronic system according to claim 3, wherein the mobile craft is an aircraft.

6. The optronic system according to claim 4, wherein the mobile craft is an aircraft.

7. The optronic system according to claim 1, further comprising a reference object database for identifying the object by comparison with the three-dimensional reconstruction.

8. The optronic system according to claim 4, wherein the computerized processing means is located in a computing station remote from the photosensitive sensor connected to the sensor by the communication means.

9. The optronic system according to claim 5, wherein the computerized processing means is located in a computing station remote from the photosensitive sensor connected to the sensor by the communication means.

10. A method of computerized processing for object identification by reconstruction of an image of an object in three dimensions using an optronic system, the method comprising:
  acquiring at a photosensitive sensor, a sequence of images of a scene including the object represented by intensity levels of an electromagnetic radiation reflected by a surface of the object, wherein the photosensitive sensor records the images of the object representing intensity levels of an electromagnetic radiation reflected by a surface of the object captured from a plurality of observation angles around the object, and wherein the photosensitive sensor captures said sequence of images by using a means for pointing towards a reference position allowing the photosensitive sensor to record a sequence of images captured from observation angles that are close to and centred on the reference position;
  reconstructing the scene, including the image of the object, in three dimensions and storing the reconstructed scene as a three-dimensional matrix, said reconstructing being carried out by a tomography function utilizing two-dimensional sectional planes of the three-dimensional matrix representing the intensity levels of the electromagnetic radiation reflected by the surface of the object;
  extracting a zone of interest from the three-dimensional reconstructed scene;
  reconstructing the surface of the object in three dimensions from the extracted zone of interest;
  for each image in the sequence of images, modifying an illumination of an image as a function of a reference image so that the illumination of the image is similar to an illumination of the reference image, such that the images of the same sequence used for said reconstructing are of equivalent illumination level; and
  comparing the object in three dimensions with a reference object to identify the object.

11. The method according to claim 10, further comprising a step of positioning an image on a reference position.

12. The method according to claim 10, further comprising a step of redimensioning an image with respect to a reference image so that dimensions of the object detected in the image are similar to dimensions of the object in the reference image.

13. The method according to claim 10 further comprising: a step of processing a sinogram of an image so as to extract object-related information from an overall information of the image.

* * * * *